United States Patent
Soni et al.

(10) Patent No.: US 10,552,501 B2
(45) Date of Patent: Feb. 4, 2020

(54) MULTILABEL LEARNING VIA SUPERVISED JOINT EMBEDDING OF DOCUMENTS AND LABELS

(71) Applicant: Oath Inc., New York, NY (US)

(72) Inventors: Akshay Soni, San Jose, CA (US); Yashar Mehdad, San Jose, CA (US); Aasish Pappu, New York, NY (US); Vivek Kulkarni, Stony Brook, NY (US); Sheng Chen, Minneapolis, MN (US)

(73) Assignee: Oath Inc., New York, NY (US)

( * ) Notice: Subject to any disclaimer, the term of this patent is extended or adjusted under 35 U.S.C. 154(b) by 309 days.

(21) Appl. No.: 15/471,455

(22) Filed: Mar. 28, 2017

(65) Prior Publication Data
US 2018/0285459 A1 Oct. 4, 2018

(51) Int. Cl.
*G06F 17/30* (2006.01)
*G06F 16/9535* (2019.01)
*G06N 5/02* (2006.01)
*G06F 16/93* (2019.01)

(52) U.S. Cl.
CPC .......... *G06F 16/9535* (2019.01); *G06F 16/93* (2019.01); *G06N 5/02* (2013.01)

(58) Field of Classification Search
None
See application file for complete search history.

(56) References Cited

U.S. PATENT DOCUMENTS

| 2013/0339386 A1* | 12/2013 | Serrano | G06F 21/6263 707/770 |
| 2014/0229160 A1* | 8/2014 | Galle | G06F 17/27 704/9 |
| 2014/0280166 A1* | 9/2014 | Bryars | G06F 16/285 707/738 |
| 2017/0061294 A1* | 3/2017 | Weston | G06F 16/334 |

* cited by examiner

*Primary Examiner* — Alex Gofman
(74) *Attorney, Agent, or Firm* — Cooper Legal Group, LLC

(57) ABSTRACT

A method implemented by at least one server computer is provided, including the following operations: receiving a plurality of training documents, each training document being defined by a sequence of words, each training document having one or more labels associated therewith; embedding the training documents, the words, and the labels in a vector space, wherein the embedding is configured to locate a given training document and its associated labels in proximity to each other in the vector space; embedding a new document in the vector space; performing a proximity search in the vector space to identify a set of nearest labels to the new document in the vector space; associating the nearest labels to the new document.

17 Claims, 9 Drawing Sheets

Precision vs. number of nearest neighbors on NCT dataset

MULTILABEL LEARNING VIA SUPERVISED JOINT EMBEDDING OF DOCUMENTS AND LABELS

BACKGROUND

1. Field of the Disclosure

The present disclosure relates to methods and systems for multilabel learning via supervised joint embedding of documents and labels.

2. Description of the Related Art

Accurate labeling of documents is important to enable their later retrieval and surfacing in the appropriate context. For example, in order to reach the right audience or community, authors of blog posts shared on social media (e.g. via blogging sites such as Tumblr) often assign keywords or "#tags" (hashtags) to these blog posts. Besides being topic-markers, hashtags also serve as group identities and brand labels. On Tumblr, authors are allowed to create their own tags or choose existing tags to label their blog. Creating or choosing tags for maximum outreach can be a tricky task and authors may not assign all the relevant tags, thereby failing to realize their full potential outreach. To alleviate this problem, algorithm-driven document tagging has emerged as a potential solution. Automatic tagging of these blogs has several downstream applications, e.g., blog search, clustering of similar blogs, showing topics associated with trending tags, and personalization of blog posts. For better user engagement, a personalization algorithm can match user interests with the tags associated with a blog post.

From the machine learning perspective, document tagging is by nature a multi-label learning (MLL) problem, where the input space is a certain feature space X of documents and the output space is the power set $2^Y$ of a finite set of tags Y. Given training data $Z \subset X \times 2^Y$, the goal is to find a function $f: X \rightarrow 2^Y$, which predicts tags for unseen documents. During training, a standard multi-label learning (MLL) algorithm typically attempts to fit the prediction function to the feature vectors of documents and the corresponding tags. It is noted that feature vectors are generated separately before training, and tags for each document are encoded as a |Y|-dimensional binary vector with one representing the presence (of a tag) and zero otherwise. The learned prediction function can then be used to output relevant tags for the input feature vectors of an unseen document. Following such a paradigm, many generic algorithms have been developed for multi-label learning.

However, with the surge of text content created by users online, such as blog posts, wilds, etc., there are several new document tagging-related challenges. Operational speed and efficiency are even more important, as fresh documents like news articles are generated on a daily basis, and it is important for the tagging system to quickly predict their tags before they go out of date. Existing tagging systems are hampered by the inability to incrementally adapt the system to new training data, thereby failing to leverage newly tagged documents or else requiring re-training from scratch. Furthermore, the tagging system may face a very large set of candidate tags which can even change dynamically, as new things are being invented and it is useful to create new tags for them.

It is in this context that implementations of the disclosure arise.

SUMMARY

Implementations of the present disclosure provide methods and systems to predict multiple-labels associated with documents in a scalable manner Multilabel learning problems arise naturally where an item can be associated with an unknown number of things simultaneously. For instance, a document can be associated with multiple categories such as politics, news, US politics, etc. Similarly, for finance related documents, a relevant task is to label the document with the most relevant ticker symbols. The ability to predict these labels precisely, in a language ignorant fashion, and in a scalable manner is desirable for an optimal multilabel learning system.

The approach disclosed herein, termed "DocTag2Vec," is language independent, provides state-of-the-art performance, and is very scalable. While other existing approaches need to be retrained in order to include new documents, labels, or both, DocTag2Vec provides an incremental solution to include new training data and labels.

It is to be noted that the problem of multilabel learning is fundamentally different from multiclass classification problems where the goal is to assign one label out of many labels to each item. In multilabel problems, each item can be assigned to an unknown number of labels out of all possible labels.

Document tagging is a task about associating a document with relevant tags selected from a pre-defined set, such as keywords or topic-labels. Accurate tagging can benefit several real-world applications, such as search and recommendation. The herein disclosed DocTag2Vec extends Word2Vec and Doc2Vec (a.k.a. Paragraph Vector)—two models for learning distributed representations of words and documents. In DocTag2Vec, we simultaneously learn the representation of words, documents, and tags in a joint vector space during training, and employ a k-nearest neighbor search to predict tags for unseen documents. In contrast to previous multi-label learning methods, DocTag2Vec directly deals with raw text instead of a provided feature vector, and in addition, enjoys advantages such as the learning of tag representation, and the ability the handle newly created tags. Experiments on several social-media datasets demonstrate promising results against state-of-the-art document tagging methods.

In some implementations, a method implemented by at least one server computer is provided, comprising: receiving a plurality of training documents, each training document being defined by a sequence of words, each training document having one or more labels associated therewith; embedding the training documents, the words, and the labels in a vector space, wherein the embedding is configured to locate a given training document and its associated labels in proximity to each other in the vector space; embedding a new document in the vector space; performing a proximity search in the vector space to identify a set of nearest labels to the new document in the vector space; associating the nearest labels to the new document.

In some implementations, the method solves a multi-label learning problem, such that a number of the nearest labels to the new document is not predefined prior to performing the proximity search.

In some implementations, the embedding is configured to simultaneously learn document vectors corresponding to the training documents and label vectors corresponding to the labels directly from the words of the training documents.

In some implementations, the embedding is configured to use the document vectors to learn the label vectors by solving a multiclass classification problem.

In some implementations, the embedding is configured to predict a target word in a given training document using context words in the given training document and identification of the given training document; wherein the embedding is configured to predict the labels of the given training document using the identification of the training document.

In some implementations, the embedding is configured to minimize a loss function.

In some implementations, the loss function includes a component configured to approximate a conditional probability of the target word based on the context words and the identification of the given training document; wherein the loss function includes a component configured to approximate a conditional probability of the labels of the given training document based on the identification of the training document.

In some implementations, embedding the new document is configured to predict a target word in the new document using context words in the new document and identification of the new document.

In some implementations, the embedding is configured to minimize a loss function that includes a component configured to approximate a conditional probability of the target word based on the context words and the identification of the new document.

In some implementations, performing the proximity search includes performing a k-nearest neighbor search.

In some implementations, the new document is not one of the training documents and does not have labels already associated therewith, and wherein the embedding of the new document is independent of the embedding of the labels in the vector space.

In some implementations, the method further comprises: receiving a request to access documents associated with one of the nearest labels to the new document; in response to the request, providing access to the new document in association with the one of the nearest labels.

In some implementations, the documents define one or more of articles, product descriptions, and social media posts.

In some implementations, the request is defined from a search query, a social media access request, a product search, a category request, a topic request, or a community access request.

In some implementations, a computer readable medium having program instructions embodied thereon is provided, the program instructions being configured, when executed by a computing device, to cause the computing device to perform the following operations: receive a plurality of training documents, each training document being defined by a sequence of words, each training document having one or more labels associated therewith; embed the training documents, the words, and the labels in a vector space, wherein the embedding is configured to locate a given training document and its associated labels in proximity to each other in the vector space; embed a new document in the vector space; perform a proximity search in the vector space to identify a set of nearest labels to the new document in the vector space; associate the nearest labels to the new document.

In some implementations, server computer is provided, comprising: training logic, the training logic configured to, receive a plurality of training documents, each training document being defined by a sequence of words, each training document having one or more labels associated therewith, and embed the training documents, the words, and the labels in a vector space, wherein the embedding is configured to locate a given training document and its associated labels in proximity to each other in the vector space; and, inference logic, the inference logic configured to, embed a new document in the vector space, perform a proximity search in the vector space to identify a set of nearest labels to the new document in the vector space, and associate the nearest labels to the new document.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
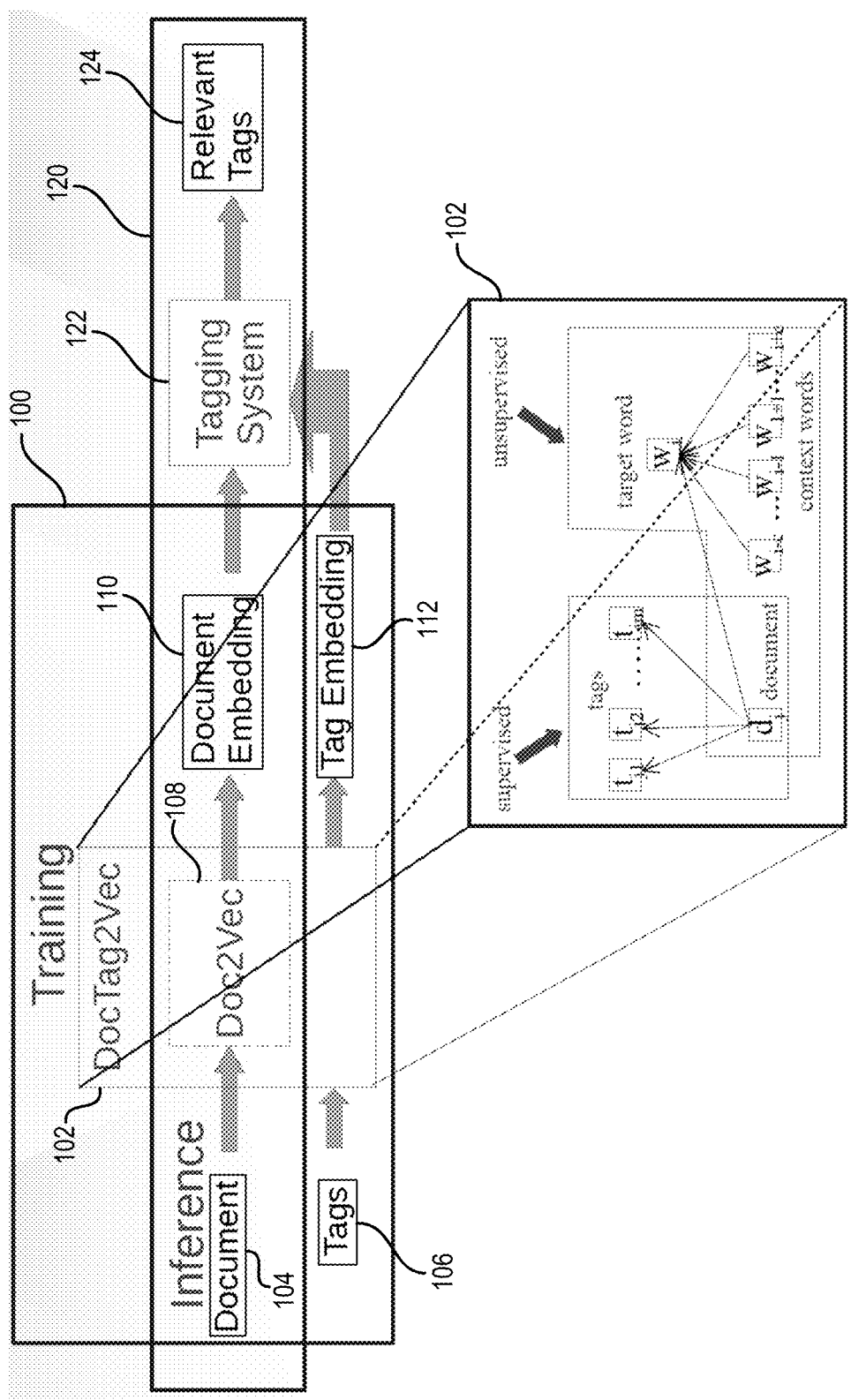
FIG. 1 provides an overview of a method and system for tagging documents, in accordance with implementations of the disclosure.

The following implementations describe systems and methods for labeling content and providing access to such content. It will be obvious, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Implementations of the disclosure provide methods and systems that assign a set of relevant labels, out of the space of all possible labels, to a given document. The input is a document (as opposed to any feature representation of it) and the output is the set of corresponding predicted labels.

A document can be defined as a sequence of words (w1, w2, w3, . . . ).

As training data, DocTag2Vec uses data of the form {(d1, L1), (d2, L2), . . . , (d3, L3)}, where di is the ith document and Li is the set of all the labels associated with the ith document.

DocTag2Vec then embeds these documents, words, and labels via a supervised variant of the doc2vec approach. Doc2vec embeds documents and words in a vector space where contextually similar documents get similar vectors (or are embedded close to each other). DocTag2Vec embeds documents, words, and labels in a same vector space such that a document and its associated labels are embedded in close proximity to each other. This is done by using the document vectors to learn label vectors by solving a multi-class classification problem. Performance is further boosted by learning multiple learners using Bagging techniques and aggregating the results.

During inference, when a new document comes in, the system embeds this document in the same vector space via doc2vec. Then the closest labels to this document in this vector space are identified to predict the associated tags. This is done via a simple k-nearest neighbor search, which can be done efficiently by using hashing techniques.

The disclosed method and system provide for the addition of new labels without retraining the entire model. This is important in systems where new items such as Ticker symbols, entities, and communities may be added continuously to the system. Experiments on both standard and proprietary multilabel datasets demonstrate that DocTag2Vec gives state-of-the-art results.

Implementations of the present disclosure provide multiple advantages, in that they are scalable, language independent, do not require feature engineering, allow dynamic introduction of labels, provide efficient inference, and give state-of-the-art results.

Implementations of the present disclosure apply DocTag2Vec to place documents and tags into a space such that each document is close to its corresponding tags. Vector representations in this space are given to both the documents and the tags. The basic method can be broken down into two major parts: training and inference/projection. During training, given a set of documents and their corresponding tags, the space is generated, a process described as document embedding and tag embedding. The outcome of training includes the document vectors and tag vectors.

Then, during inference/projection, for a new document, a position for that document is found in the space. Then the nearest tags to the document are found, and these tags are assigned to the document. In some implementations, for a new document, Doc2Vec is applied to get the document vector and then a k-nearest neighbor search is applied to find the corresponding tags.

Existing approaches do not consider the learning of vector representations for documents and tags from raw text data. They typically disclose algorithms/systems which only focus on the phase of learning predictors, while implementations in the present disclosure simultaneously learn the embedded feature vectors and predictors that can assign tags to new documents.

Recent works on distributed representation of words and documents include, e.g., Word2Vec (Mikolov, T.; Sutskever, I.; Chen, K.; Corrado, G. S.; and Dean, J., 2013, "Distributed representations of words and phrases and their compositionality," *Advances in Neural Information Processing Systems* 26. 3111-3119) and Doc2Vec (a.k.a. Paragraph Vector) (Le, Q. V., and Mikolov, T., 2014, "Distributed representations of sentences and documents," ICML, volume 14, 1188-1196). Word2Vec and Doc2Vec aim at learning low-dimensional feature vectors (i.e., embeddings) for words and documents from a large corpus in an unsupervised manner, such that similarity between words (or documents) can be reflected by some distance metric determined from their embeddings. The general assumption behind Word2Vec and Doc2Vec is that more frequent co-occurrence of two words inside a small neighborhood of a document should imply higher semantic similarity between them. DocTag2Vec extends this idea to documents and tags by positing that a document and its associated tags should share high semantic similarity, which allows learning the embeddings of tags along with documents.

FIG. 1 provides an overview of a method and system for tagging documents, in accordance with implementations of the disclosure. Two notable differences between the illustrated (DocTag2Vec) method and the standard multi-label learning framework are that (1) the DocTag2Vec method works directly with raw text and does not require feature vectors to be extracted in advance; and (2) DocTag2Vec produces tag embeddings that carry semantic information, which is generally not available from a standard multilabel learning framework.

During training (ref. 100), DocTag2Vec (ref. 102) directly takes the raw documents 104 and tags 106 as input and learns their embeddings/vector representations (document embeddings 110 and tag embeddings 112) using stochastic gradient descent (SGD).

During inference (ref. 120), the goal of the tagging system 122 is to find the appropriate tags for a new document. This is accomplished by first embedding the new document in the same vector space via Doc2Vec. Then the closest tags to this document in the vector space are identified based on a distance metric. This can be done via a simple k-nearest neighbor search, which can also be efficiently performed using hashing techniques. The output of the tagging system 122 is a set of relevant tags 124 that are associated with the new document, and which can be used for various purposes, such as for categorization, search/retrieval, etc.

In some implementations, a threshold distance can be set so that tags greater than the threshold distance will not be considered relevant or trustworthy. In some implementations, if no tags are found within the threshold distance (or a minimum number of tags is not found within the threshold distance), then the document could be sent to editors for manual tagging, and then added to the training data.

Figure 2A:
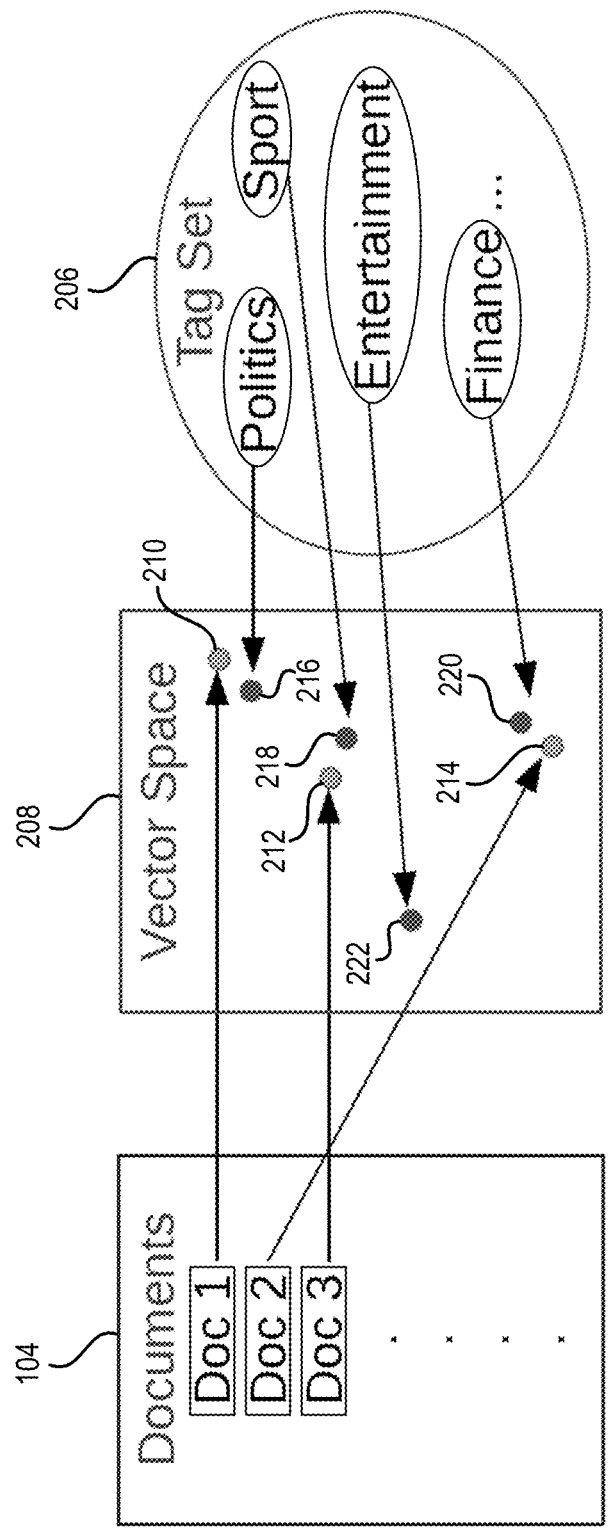
FIG. 2A conceptually illustrates the output of DocTag2Vec, in accordance with implementations of the disclosure.

FIG. 2A conceptually illustrates the output of DocTag2Vec, in accordance with implementations of the disclosure. As shown, the output includes the set of document and tag representations learned in the same vector space 208. By way of example, the document "Doc 1" is assigned a vector representation 210 located in the vector space 208; the document "Doc 2" is assigned a vector representation 212 in the vector space 208; and the document "Doc 3" is assigned a vector representation 214 in the vector space 208; etc. Simultaneous with the assignment of vector representations to the documents, the corresponding tags of the documents are also assigned vector representations in the vector space 208, such that the locations of tags in the vector space 208 will be close to their corresponding documents (based on a distance metric, e.g. cosine distance). Thus, as shown, the tag "Politics" is assigned a vector representation 216 in the vector space 208; the tag "Sport" is assigned a vector representation 218 in the vector space 208; the tag "Finance" is assigned a vector representation 220 in the vector space 208; the tag "Entertainment" is assigned a vector representation 222 in the vector space 208.

By the closeness between documents and tags (e.g. cosine distance), it can be inferred that the document "Doc 1" is probably about "Politics" while the document "Doc 2" is likely about "Finance," and so on. In terms of inference/prediction, a new document is first embedded using a Doc2Vec component inside the DocTag2Vec, and tags are then assigned by searching for the nearest tags embedded around the document.

Figure 2B:
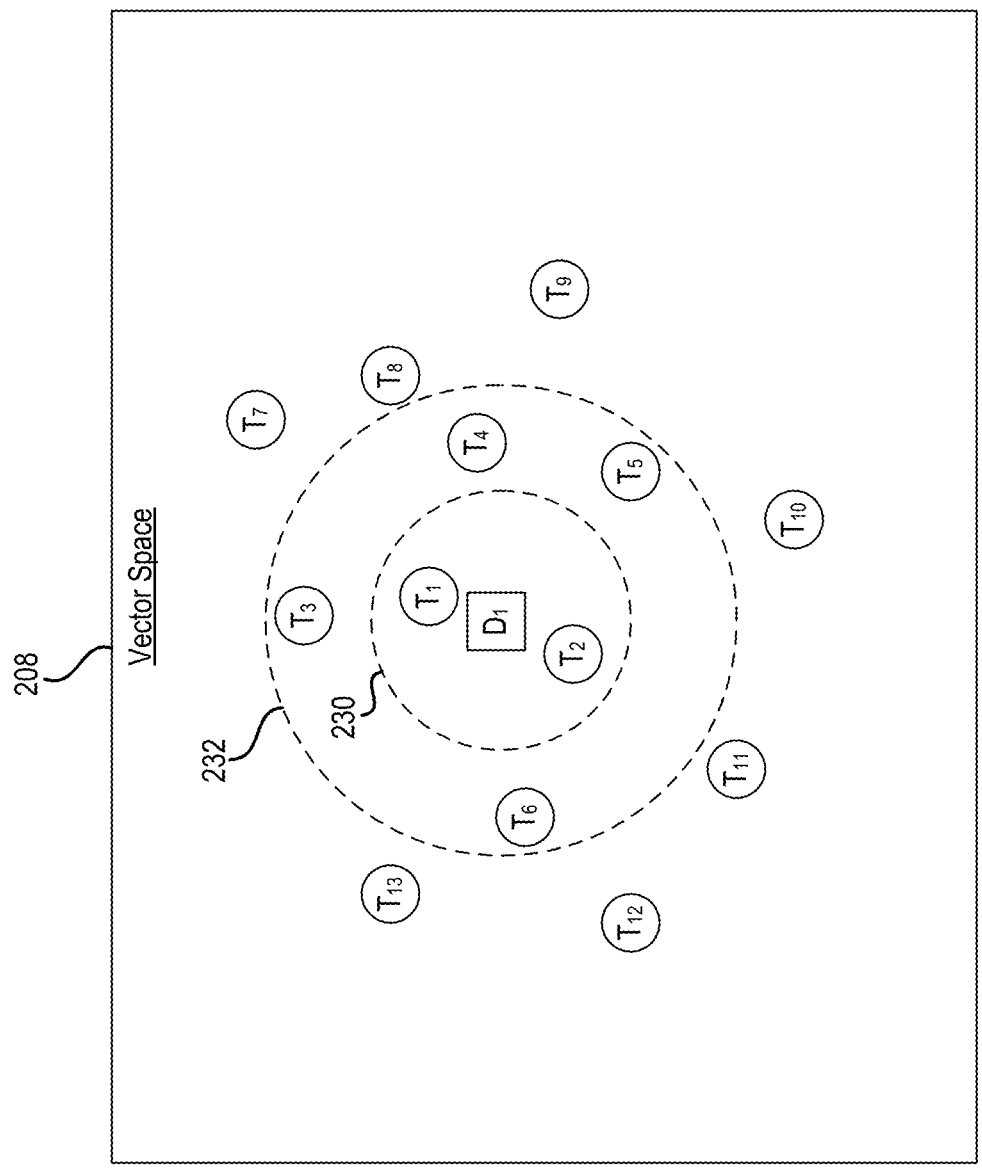
FIG. 2B conceptually illustrates the identification of labels for a new document, in accordance with implementations of the disclosure.

FIG. 2B conceptually illustrates the identification of labels for a new document, in accordance with implementations of the disclosure. As noted above, a set of labels/tags, including tags $T_1$ to $T_{13}$ is embedded in a vector space 208 using labeled training documents. A new document $D_1$ (that has not been labeled, or for which labels nonetheless are to be identified) is embedded in the vector space 208. To determine labels for the new document, those labels that are closest to the new document $D_1$ in the vector space, as determined from a distance-based metric (e.g. cosine distance), are identified as labels for the new document $D_1$. For example, in some implementations, labels that are situated within a predefined distance threshold are identified as labels for the new document. For example, a distance threshold 230 in the illustrated implementation will include tags $T_1$ and $T_2$, while excluding the remaining tags. In some implementations, the distance threshold is dynamically adjustable. For example, if not enough tags are returned (e.g. less than a minimum number of tags), then the distance threshold may be expanded to a threshold 232, so as to further include tags $T_3$ to $T_6$.

In some implementations, a k-nearest neighbor search can be performed to identify a predefined number k of nearest labels. In some implementations, the predefined number of nearest labels that will be identified is dynamically adjustable. In some implementations, labels that are located beyond a predefined distance threshold may be excluded.

Overall, approach disclosed herein has several merits. The SGD training supports the incremental adjustment of DocTag2Vec to new data. The prediction process can utilize a relatively simple k-nearest neighbor search among tags, rather than documents, whose run time does not scale up effectively as training data increases. Since the DocTag2Vec method represents each individual tag using its own embedding vector, it is easy to dynamically incorporate new tags. Furthermore, the output tag embeddings can be used in other applications.

Below is a mathematical description of the embedding based multi-label learning method for document tagging, termed DocTag2Vec.

Let V be the size of the vocabulary (i.e., set of unique words), N be the number of documents in the training set, M be the size of the tag set, and K be the dimension of the vector space of embedding. The vocabulary is denoted as $W = \{w_1, \ldots w_V\}$, the set of documents as $\mathcal{D} = \{d_1, \ldots, d_N\}$, and the set of tags as $T = \{t_1, \ldots, t_M\}$. Each document $d \in \mathcal{D}$ is basically a sequence of $n_d$ words represented by $(w_1^d, w_2^d, \ldots, w_{n_d}^d)$, and is associated with $M_d$ tags $T_d = \{t_1^d, \ldots t_{M_d}^d\}$. Here the subscript d of n and M suggests that the number of words and tags is different from document to document. For convenience, the shorthand $w_i^d : w_j^d$, $i \leq j$, is used to denote the subsequence of words $w_i^d, w_{i+1}^d, \ldots, w_{j-1}^d, w_j^d$ in document d. Correspondingly, $W = [w_1, \ldots, w_V] \in R^{K \times V}$ denotes the matrix for word embeddings, $D = [d_1, \ldots, d_N] \in R^{K \times N}$ denotes the matrix for document embeddings, and $T = [t_1, \ldots, t_M] \in R^{K \times M}$ denotes the matrix for tag embeddings. The symbol $d_i$ can in some instances be used interchangeably with the embedding vector $d_i$ to refer to the i-th document, and $d_d$ can be used to denote the vector representation of document d. Similar conventions apply to word and tag embeddings. $\sigma(\cdot)$ denotes the sigmoid function, i.e., $\sigma(a) = 1/(1+\exp(-a))$.

Word2Vec is an unsupervised model for learning embedding of words. Essentially, Word2Vec embeds all words in the training corpus into a low-dimensional vector space, so that the semantic similarities between words can be reflected by some distance metric (e.g., cosine distance) defined based on their vector representations. Training the Word2Vec model entails minimizing the loss function associated with a certain classifier with respect to both feature vectors (i.e., word embeddings) and classifier parameters, such that the nearby words are able to predict each other. For example, in a continuous bag-of-words (CBOW) framework, Word2Vec specifically minimizes the following average negative log probability:

$$\sum_{d \in \mathcal{D}} \sum_{i=1}^{n_d} -\log p(w_i^d \mid w_{i-c}^d : w_{i-1}^d, w_{i+1}^d : w_{i+c}^d),$$

where c is the size of context window inside which words are defined as "nearby." To ensure the conditional probability above is legitimate, it is usually necessary to evaluate a partition function, which may lead to a computationally prohibitive model when the vocabulary is large. One way to bypass such an issue is to use hierarchical softmax (HS), which factorizes the conditional probability into products of some simple terms. Hierarchical softmax relies on the construction of a binary tree $\mathcal{B}$ with V leaf nodes, each of which corresponds to a particular word in the vocabulary $\mathcal{W}$. HS is parameterized by a matrix $H \in R^{K \times (\nu-1)}$, whose columns are respectively mapped to a unique nonleaf node of B. Additionally, we define Path(w)={(i,j)∈B|edge (i,j) is on the path from root to word w}. Then the negative log probability is given as $$-\log p(w_i^d \mid w_{i-c}^d : w_{i-1}^d, w_{i+1}^d : w_{i+c}^d)$$

$$= -\log \prod_{(u,v) \in Path(w_i^d)} \sigma(\text{child}(v) \cdot \langle g_i^d, h_v \rangle)$$

$$= -\sum_{(u,v) \in Path(w_i^d)} \log \sigma(\text{child}(v) \cdot \langle g_i^d, h_v \rangle),$$

$$g_i^d = \sum_{\substack{-c \le j \le c \\ j \ne 0}} w_{i+j}^d,$$

where child (u,v) equals to 1 if v is the left child of u and 0 otherwise. In a CBOW Word2Vec framework, $g_i^d$ is basically the input feature for an HS classifier corresponding to a projection layer, which essentially summarizes the feature vectors of context words surrounding $w_i^d$, and other options like averaging of $w_{i+j}^d$ can also be applied. This Word2Vec model can be directly extended to Distributed memory (DM) Doc2Vec model by conditioning the probability of $w_i^d$ on d as well as $w_{i-c}^d, \ldots, w_{i+c}^d$, which yields $$-\log p(w_i^d \mid w_{i-c}^d : w_{i-1}^d, w_{i+1}^d : w_{i+c}^d, d)$$

$$= -\sum_{(u,v) \in Path(w_i^d)} \log \sigma(\text{child}(v) \cdot \langle \tilde{g}_i^d, h_v \rangle),$$

$$\tilde{g}_i^d = d_d + \sum_{\substack{-c \le j \le c \\ j \ne 0}} w_{i+j}^d.$$

In the DM Doc2Vec model as shown, instead of optimizing some rigorously defined probability function, both Word2Vec and Doc2Vec can be trained using other objectives, e.g., negative sampling (NEG).

Training for DocTag2Vec

DocTag2Vec extends the DM Doc2Vec model by adding another component for learning tag embeddings. In addition to predicting the target word $w_i^d$ using context $w_{i-c}^d, \ldots w_{i+c}^d$, As shown in FIG. 1, DocTag2Vec also uses the document embedding to predict each associated tag, so that documents and their associated tags can be closely embedded. The joint objective is given by $$\sum_{d \in \mathcal{D}} \sum_{i=1}^{n_d} \left( -\log p(w_i^d \mid w_{i-c}^d : w_{i-1}^d, w_{i+1}^d : w_{i+c}^d, d) - \alpha \sum_{t \in T_d} \log p(t \mid d) \right),$$

where α is a tuning parameter. As discussed for Word2Vec, the problem of evaluating costly partition function is also faced by the newly introduced probability p(t|d). However, unlike the conditional probability of $w_i^d$, the probability p(t|d) cannot be modeled using hierarchical softmax, as the columns of the parameter matrix do not have one-to-one correspondence to tags (and it is important to obtain a vector representation for each tag). By applying a negative sampling approach, the following objective can be formulated for learning tag embedding to approximate a proper probability function, $$-\sum_{t \in T_d} \log \sigma(\langle d_t, t_t \rangle) + r \cdot \mathbb{E}_{t \sim p}[\log \sigma(-\langle d_t, t \rangle)],$$

where p is a discrete distribution over all tag embeddings $\{t_1, \ldots, t_M\}$ and r is an integer-valued hyperparameter. The goal of such an objective is to differentiate the tag t from the draws according to p, which is chosen as uniform distribution for simplicity in some implementations. Now the final loss function for DocTag2Vec is a combination of the foregoing, $$\ell(W, D, T, H) = \sum_{d \in \mathcal{D}} \sum_{i=1}^{n_d} \left( \begin{array}{c} -\sum_{(u,v) \in Path(w_i^d)} \log \sigma(\text{child}(v) \cdot \langle \tilde{g}_i^d, h_v \rangle) - \\ \overline{\text{DM Doc2Vec with hierarchical softmax}} \\ \alpha \sum_{t \in T_d} \log \sigma(\langle d_t, t_t \rangle) + r \cdot \mathbb{E}[\log \sigma(-\langle d_t, t \rangle)] \\ \overline{\text{tag embedding with negative sampling}} \end{array} \right)$$

One can minimize l(W, D, T, H) using stochastic gradient descent (SGD). To avoid exact calculation of the expectation in negative sampling, at each iteration r i.i.d. instances of t are sampled from distribution p, denoted by $\{t_p^1, t_p^2, \ldots, t_p^r\}$, to stochastically approximate the expectation, i.e., $\Sigma_{j=1}^r \log \sigma(-\langle d_t, t_p^j \rangle) \approx r \cdot \mathbb{E}[\log \sigma(-\langle d_t, t \rangle)]$.

Prediction for DocTag2Vec

Unlike Word2Vec and Doc2Vec, which only target learning high-quality embeddings of words and documents, DocTag2Vec is configured also to make predictions of relevant tags for new documents. To this end, the new document is first embedded via the Doc2Vec component within DocTag2Vec and then a k-nearest neighbor (k-NN) search among tags is performed. To be specific, given a new document d, first the DM Doc2Vec objective is optimized with respect to $d_d$ by fixing W and H. It will be noted that this is the standard inference step for new document embedding in Doc2Vec. Once $d_d$ is obtained, a search is performed for the k-nearest tags to it based on cosine similarity. Hence the prediction function is given as $f_k(d_d) = \{i | u_i$ is in the largest k entries of $u = \overline{T}^T d_d\}$, where $\overline{T}$ is the column-normalized version of T. To boost the prediction performance of DocTag2Vec, a bootstrap aggregation (a.k.a. bagging) technique can be applied to DocTag2Vec. Broadly speaking, this entails training b DocTag2Vec learners using different randomly sampled subsets of training data, resulting in b different tag predictors $f_{k'}^1(\cdot), \ldots, f_{k'}^b(\cdot)$ along with their tag embedding matrices $T^1, \ldots T^b$. In general, the number of nearest neighbors k' for an individual learner can be different from k. In the end, combining the predictions from different models by selecting from $\cup_{j=1}^{b} f_k^j(d_d)$ the k tags with the largest aggregated similarities with $d_d$, yields the following:

$$f_k^{bag}(d_d) = \left\{ i \mid u_i \text{ is in the largest } k \text{ entries of } u, \right.$$

$$\left. \text{where } u_i = \sum_{j=1}^{b} \mathbb{I}\{i \in f_k^j, (d_d)\} \cdot \langle \bar{t}_i^j, \bar{d}_d \rangle \right\}.$$

Experiments were carried out using various datasets. It should be noted that DocTag2Vec uses raw texts as input instead of extracted features. Therefore many benchmark datasets for evaluating multi-label learning algorithms are not suitable for testing. Emphasis was placed on the diversity of the source of tags, which capture different aspects of documents. The statistics of all datasets are provided in Table 1 below.

TABLE 1

Statistics of Datasets

| Dataset | #training point | #testing point | #unique tags | Avg #tags per document |
|---|---|---|---|---|
| Wiki10 | 14095 | 6600 | 31177 | 17.27 |
| WikiNER | 89521 | 10000 | 67179 | 22.96 |
| Relevance Modeling (Chinese) | 4505 | 500 | 391 | 1.02 |
| Relevance Modeling (Korean) | 1292 | 500 | 261 | 1.07 |
| NCT (all) | 40305 | 9546 | 883 | 1.88 |
| NCT (general) | 39401 | 9389 | 294 | 1.76 |
| NCT (specific) | 17278 | 4509 | 412 | 1.41 |

Wiki10: The wiki10 dataset contains a subset of English Wikipedia documents, which are tagged collaboratively by users from the social bookmarking site Delicious. The two uninformative tags, "wikipedia" and "wiki," were removed from the collected data.

WikiNER: WikiNER has a larger set of English Wikipedia documents. The tags for each document are the named entities inside it, which is detected automatically by some named entity recognition (NER) algorithm.

Relevance Modeling (RM): The RM dataset consists of two sets of financial news article in Chinese and Korean respectively. Each article is tagged with related ticker symbols of companies given by editorial judgement.

News Content Taxonomy (NCT): NCT dataset is a collection of news articles annotated by editors with topical tags from a taxonomy tree. The closer the tag is to the root, the more general the topic is. For such tags with hierarchical structure, evaluation was also separately carried out for tags of general topics (depth=2) and specific topics (depth=3).

The baselines compared include one of the state-of-the-art multi-label learning algorithms called SLEEC, a variant of DM Doc2Vec, and an unsupervised entity linking system, FastEL, which is specific to the WikiNER dataset. SLEEC is based on non-linear dimensionality reduction of binary tag vectors, and uses a sophisticated objective function to learn the prediction function. For comparison, the TF-IDF representation of a document was used as the input feature vector for SLEEC, as it yields better results than embedding based features like the Doc2Vec feature. To extend DM Doc2Vec for tagging purpose, basically we replace the document d in the Doc2Vec schema with tags $t_1^d, \ldots, t_{M_d}^d$, and train Doc2Vec to obtain the tag embeddings. During testing, the same steps as DocTag2Vec were performed to predict the tags, i.e., inferring the embedding of a test document followed by k-NN search. FastEL is an unsupervised approach for entity linking of web search queries that walks over a sequence of words in a query and aims to maximize the likelihood of linking the text span to an entity in Wikipedia. The FastEL model calculates the conditional probabilities of an entity given every substring of the input document, however avoid computing entity to entity joint dependencies, thus making the process efficient. A FastEL model was built using query logs that spanned 12 months and Wikipedia anchor text extracted from Wikipedia dumps dated November 2015. An entity linker baseline was chosen because it is a simple way of detecting topics/entities that are semantically associated with a document.

Regarding hyperparameter setting, both SLEEC and DocTag2Vec aggregate multiple learners to enhance the prediction accuracy, and the number of learners was set to 15. For SLEEC, the rest of the hyperparameters were tuned using grid search. Since DocTag2Vec and Doc2Vec are both embedding based methods, they share some hyperparameters in common. In particular, the number of epochs for SGD was set to 20 and the window size c set to 8. To train each individual learner, randomly sample 50% training data. In terms of the nearest neighbor search, set $k^o=10$ for Wiki10 and WikiNER while keeping $k^o=5$ for others. For the remaining hyperparameters, grid search was applied to find the best ones. For DocTag2Vec, additionally set the number of negative tags r and the weight $\alpha$ in the final loss function. Typically r ranges from 1 to 5, and r=1 gives the best performance on RM and NCT datasets. An empirically good choice for a is between 0.5 and 5. For FastEL, a sliding window of size 5 over the raw-text (no punctuations) of document was applied to generate entity candidates. The number of candidates per document was limited to 50.

Figure 3:
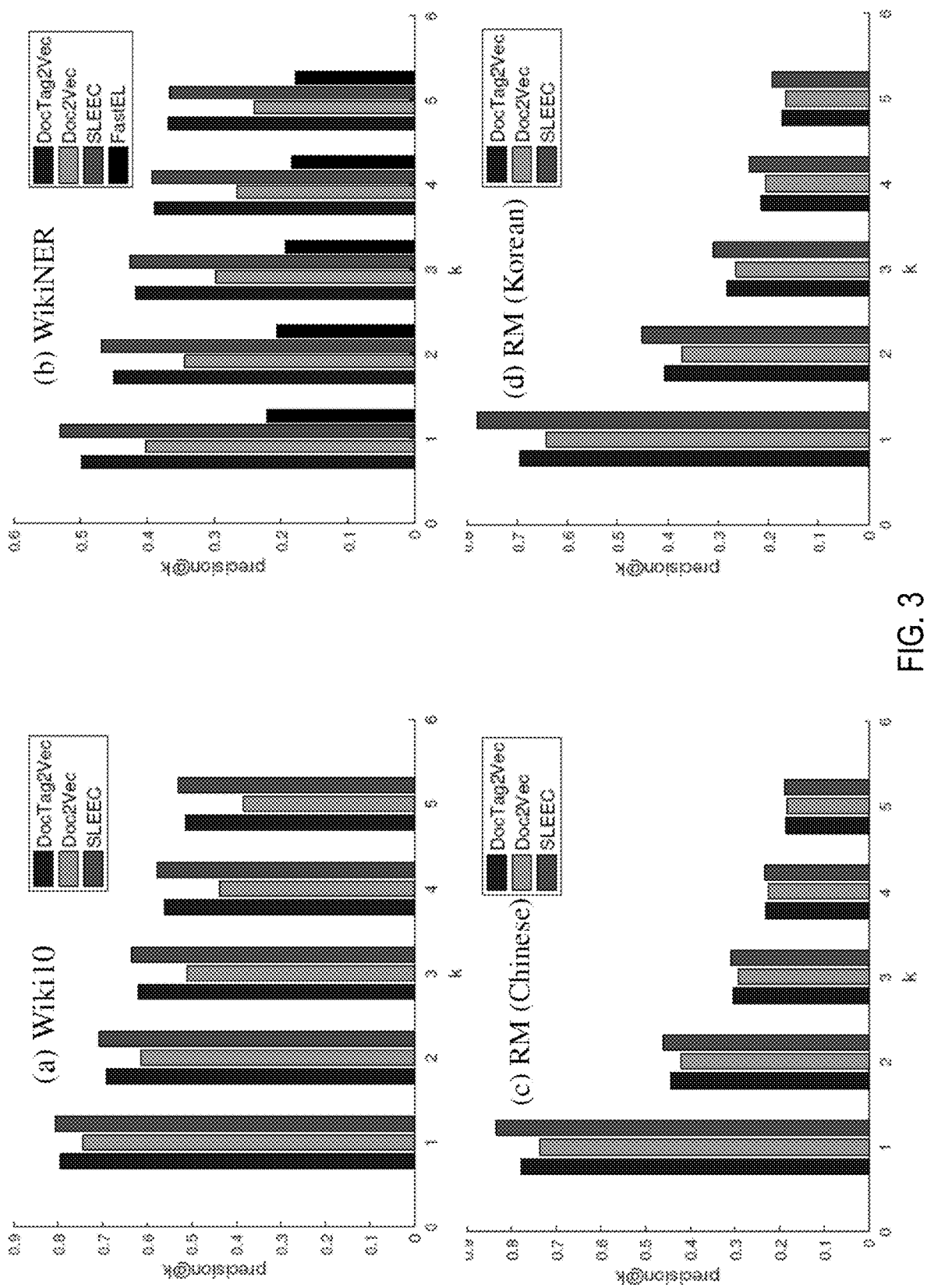
FIG. 3 shows the precision plot of different approaches against choices of k on various datasets, in accordance with implementations of the disclosure.

In experiments, precision@k was used as the evaluation metric for performance FIG. 3 shows the precision plot of different approaches against choices of k on Wiki10, WikiNER and RM dataset. On Wiki10, we see that the precision of DocTag2Vec is close to the one delivered by SLEEC, while Doc2Vec performs much worse. A similar result is observed on WikiNER except for the precision@ 1, but precision of DocTag2Vec catches up as k increases. For the RM dataset, SLEEC outperforms our approach, and such gap is likely due to the small size of training data, from which DocTag2Vec is not able to learn as good embeddings.

Figure 4:
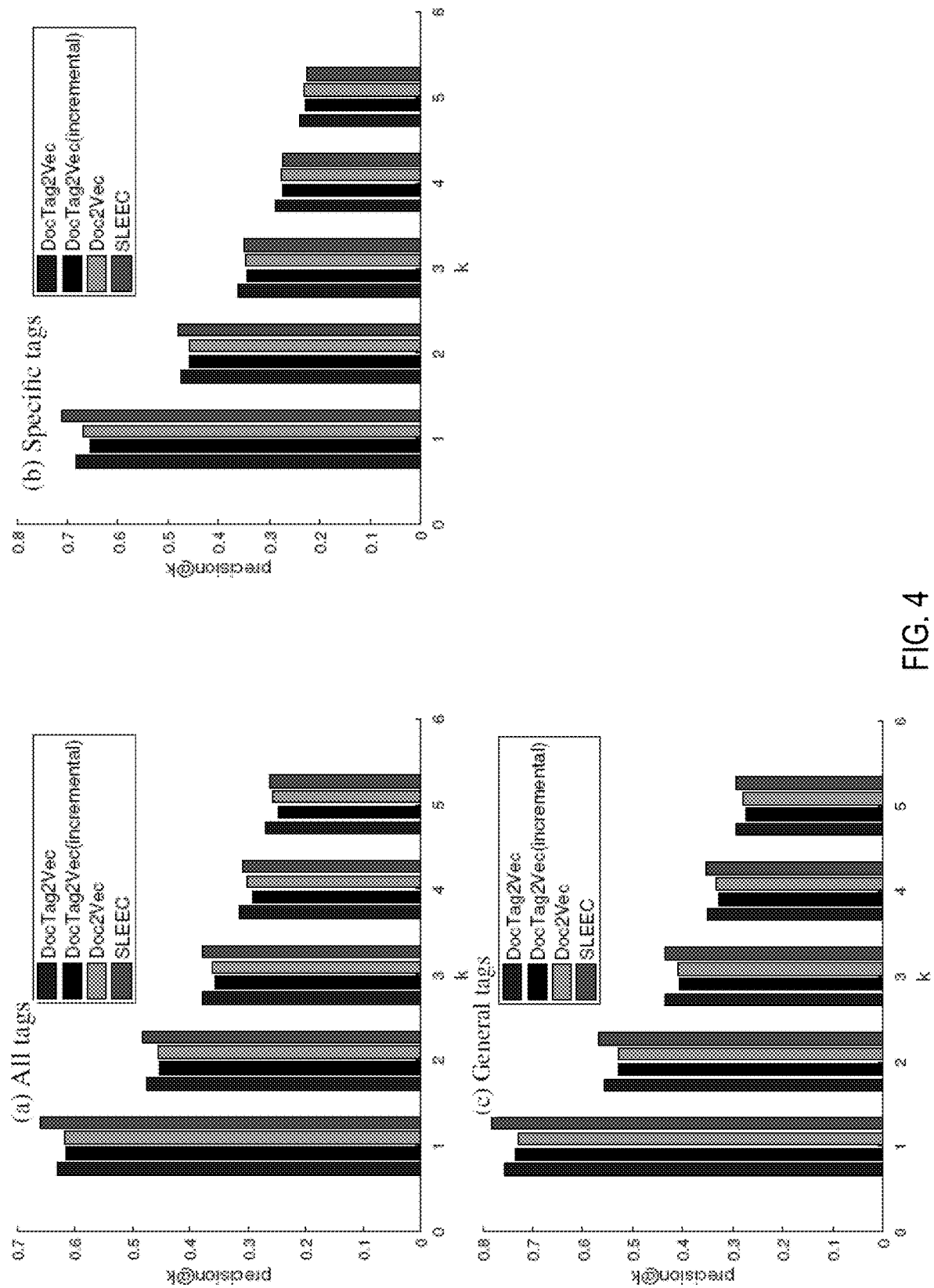
FIG. 4 shows the precision plot of different approaches against choices of k on a dataset, in accordance with implementations of the disclosure.
Figure 5:
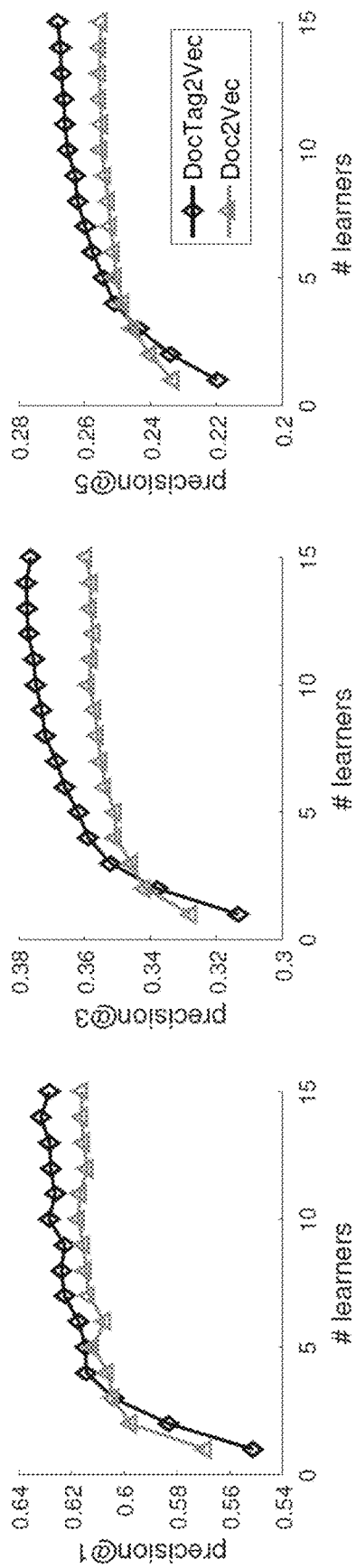
FIG. 5 shows the precision plot against the number of learners b, in accordance with implementations of the disclosure.
Figure 6:
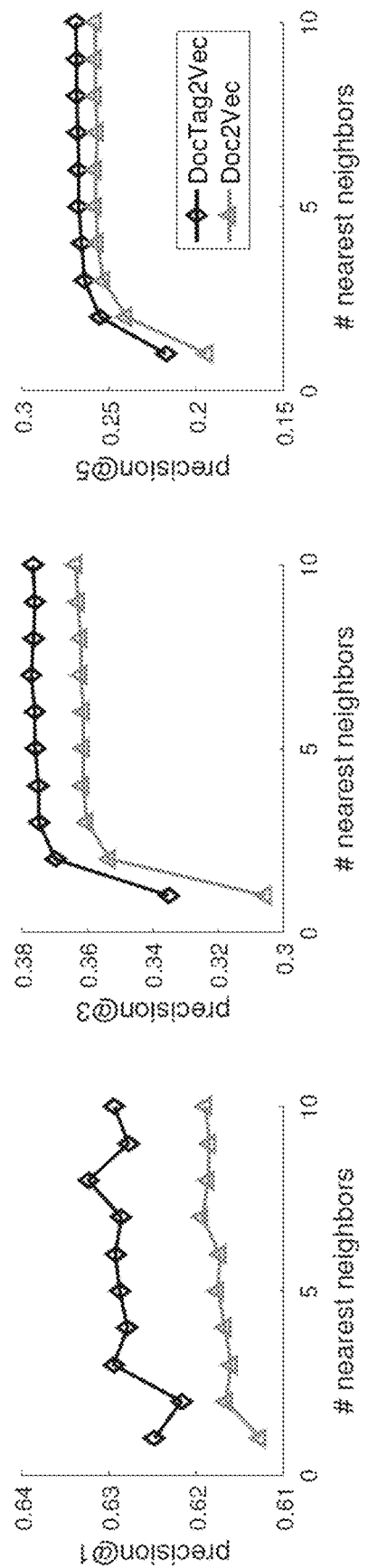
FIG. 6 shows the precision plot against the number of nearest neighbors $k^0$ for an individual learner, in accordance with implementations of the disclosure.

For the NCT dataset, training DocTag2Vec was also performed incrementally, i.e., each time only feed 100 documents to DocTag2Vec and let it run SGD, and we keep doing so until all training samples are presented. As shown in FIG. 4, DocTag2Vec outperforms the Doc2Vec baseline, and delivers competitive or even better precision in comparison with SLEEC. Also, the incremental training does not sacrifice too much precision, which makes DocTag2Vec even more appealing. The overall recall of DocTag2Vec is also slightly better than SLEEC, as shown in Table 2. FIGS. 5 and 6 include the precision plot against the number of learners b and the number of nearest neighbors $k^o$ for individual learner, respectively. It is not difficult to see that after b=10, adding more learners does not give a significant improvement in precision. For the nearest neighbor search, $k^o=5$ would suffice.

TABLE 2

Overall Recall on News Content Taxonomy Dataset

|  | DocTag2Vec | DocTag2Vec (incremental) | Doc2Vec | SLEEC |
|---|---|---|---|---|
| NCT (all tags) | 0.6702 | 0.6173 | 0.6389 | 0.6524 |
| NCT (specific tags) | 0.8111 | 0.7678 | 0.7810 | 0.7624 |
| NCT (general tags) | 0.7911 | 0.7328 | 0.7521 | 0.7810 |

Compared with classical multi-label learning methods, DocTag2Vec provides several benefits, such as allowing incremental updates of the model, handling the dynamic change of tag set, as well as producing feature representations for tags. Document tagging can benefit a number of applications on social media. If text content provided over the web is correctly tagged, articles or blog posts can be pushed to the right users who are likely to be interested. And such improved personalization will potentially improve the user engagement.

There are numerous applications for the methods and systems for labeling documents disclosed herein. Examples of such applications are provided herein by way of example, without limitation.

In some implementations, the labeling methods and systems of the present disclosure can be applied for purposes of tagging social media content, such as posts or other types of content shared via a social networking site (e.g. Tumbler, Facebook, Twitter, LinkedIn, etc.). In the context of social media, it is common for users to tag content (e.g. using "hashtags" denoted by the hash character "#"). These tags serve as labels of the content, so that a search for a given tag will surface content that has been tagged with the given tag.

Users are generally responsible for tagging their own content. However, an author may not reach his/her intended audience, or may limit the scope of the audience, due to failure to appropriately or fully tag their content. For example, they may assign certain tags, but not all tags that would be useful for reaching their intended audience. Thus, in some implementations, the methods and systems for determining labels of content can be applied to automatically generate tags for social media content, thereby expanding the reach of user-shared content on a social network. For example, a post on the social network Tumbler could be automatically hashtagged with system-generated tags.

In another implementation, articles (e.g. news articles) could be categorized by topic using the labeling mechanisms described herein. In some implementations, a newly ingested news article can be labeled with category related tags. In some implementations, a finance document can be tagged with related ticker symbols.

In another example, in the Yahoo! Newsroom application, users can post articles to various "Vibes," which are topics that also designate social communities. Users accessing a given Vibe will see articles that have been associated to the given Vibe. However, as the user is responsible for choosing which Vibes/topics to which an article will be associated, he/she may fail to share the article to all the relevant Vibes. Thus, in some implementations, the system may automatically post a given article to various Vibes as determined based on the presently disclosed labeling methods (using the Vibes as the possible labels). In some implementations, the system may provide recommendations to the user regarding which Vibes to which a particular article could be posted.

Hence in some implementations, articles can be labeled with related communities. This is an important and novel use of multi-label learning. In social media, the knowledge of associated communities allows targeting of content to proper audiences. Thus, by labeling content with relevant communities, content can be provided to the most relevant audiences, thereby increasing the reach of a given piece of content and driving user engagement.

In some implementations, each document can be associated with a set of corresponding entities present. This addresses the problem of entity recommendation, which can be useful for a search or content portal website (e.g. Yahoo! Homepage).

In the e-commerce context of a product marketplace, it is important for products to be properly categorized and labeled to make them accessible and/or searchable by customers. A single product may be appropriately associated with many different labels; e.g. an article of women's basketball clothing could be labeled for "clothing," "apparel," "fitness," "women," "basketball," etc. Traditional sources of product information, such as editorially assigned categories and manufacturer-provided product descriptions, may not capture the full extent of relevant labels for a given product. Therefore, in some implementations, products can be automatically labeled or categorized using the methods of the present disclosure.

For example, the product description can be used as the document in the DocTag2Vec method to assign tags for the product. Having appropriate and complete product tagging enables improved functionality of search for products and product categorization. Furthermore, some product descriptions are incomplete. However, an automatic tagging system can help assign tags similar to those of other similar products, and can infer tags that might not be in the description.

Figure 7:
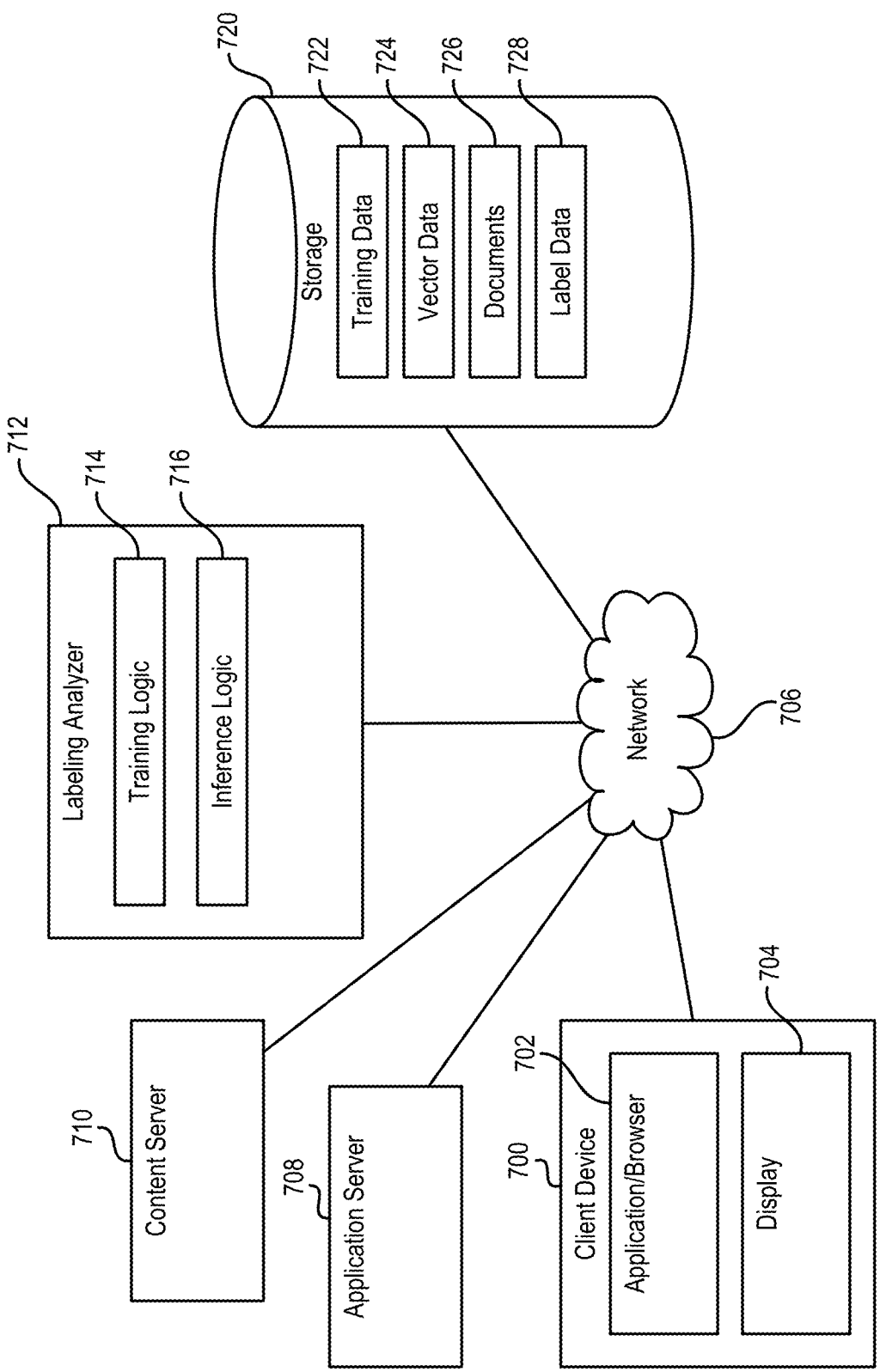
FIG. 7 illustrates a system for labeling content and providing access to such content, in accordance with implementations of the disclosure.

FIG. 7 illustrates a system for labeling content and providing access to such content, in accordance with implementations of the disclosure. Broadly speaking, the system can be configured to perform any of the methods for labeling content and serving such content described in accordance with implementations of the present disclosure. A client device 700 is operated by a user to access a content site or platform, which in various implementations may be a social content/networking/sharing site, an e-commerce site, a news site, forum site, blogging site, etc. The client device 700 executes an application 702 (which in some implementations, may be a browser application or a web application) that is configured to render to the display 704 of the client device 700 an interface for interacting with the content site. The application 702 may communicate over a network 706 (e.g. the Internet) with an application server 708 to obtain data so that the user may access the content site, including accessing specific content, topics/categories, a personalized feed, etc.

It will be appreciated that in some implementations, content can be obtained from a separate content server 710 for rendering in the context of the interface that is rendered on the client device 700. For example, a preview of a piece of content (e.g. an article from a $3^{rd}$ party news source) may be provided, and accessing the article may redirect to obtain the full content from the content server 710 (e.g. the $3^{rd}$ party news source's content server).

A labeling analyzer 712 is configured to perform labeling of documents in accordance with the methods disclosed herein. The labeling analyzer 712 includes training logic 714 that is configured to process training data 722 that is stored to a storage 720. The training data 722 consists of labeled documents, and the training logic 714 is configured to embed the documents and their labels in a vector space as has been described above, which is stored as vector data 724. The labeling analyzer 712 further includes an inference logic 716 that is configured to embed new documents 726 in the vector space, and assign labels to the documents, which are stored as label data 728 in association with their respective documents.

It will be appreciated that the documents 726, thus labeled by the labeling analyzer 712, can be provided through the application server 708 or content server 710 in response to a user request, such as a search query or a request to view a given topic, category, or feed.

Figure 8:
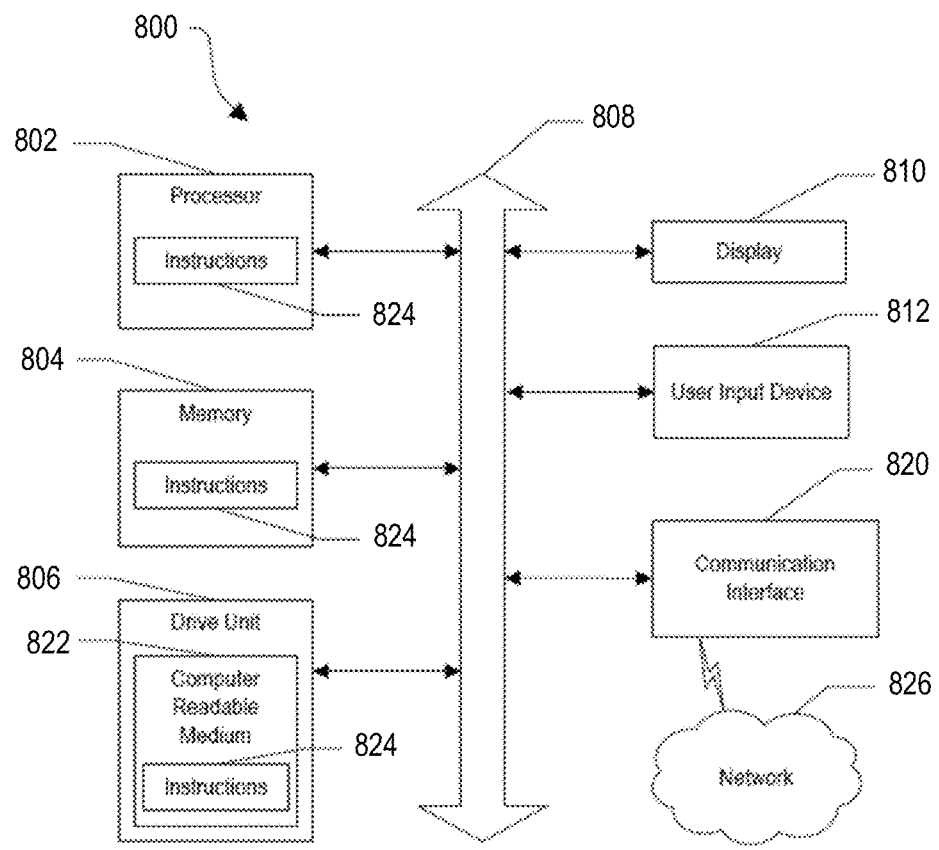
FIG. 8 illustrates an implementation of a general computer system, in accordance with an implementation of the disclosure.

FIG. 8 illustrates an implementation of a general computer system designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may further include a display unit 810, such as a liquid crystal display (LCD), an organic light emitting diode (OLED), a flat panel display, a solid state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of system 800. The input device 812 may be a number pad, a keyboard, or a cursor control device, such as a mouse, or a joystick, touch screen display, remote control or any other device operative to interact with the computer system 800.

The computer system 800 may also or alternatively include a disk or optical drive unit 806. The disk drive unit 806 may include a computer-readable medium 822 in which one or more sets of instructions 824, e.g. software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 826 can communicate voice, video, audio, images or any other data over the network 826. Further, the instructions 824 may be transmitted or received over the network 826 via a communication port or interface 820, and/or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800, or combinations thereof. The connection with the network 826 may be a physical connection, such as a wired Ethernet connection or may be established wirelessly as discussed below. Likewise, the additional connections with other components of the system 800 may be physical connections or may be established wirelessly. The network 826 may alternatively be directly connected to the bus 808.

While the computer-readable medium 822 is shown to be a single medium, the term "computer-readable medium"

may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to one or more networks 826. The network 826 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 826 may include wide area networks (WAN), such as the Internet, local area networks (LAN), campus area networks, metropolitan area networks, a direct connection such as through a Universal Serial Bus (USB) port, or any other networks that may allow for data communication. The network 826 may be configured to couple one computing device to another computing device to enable communication of data between the devices. The network 826 may generally be enabled to employ any form of machine-readable media for communicating information from one device to another. The network 826 may include communication methods by which information may travel between computing devices. The network 826 may be divided into sub-networks. The sub-networks may allow access to all of the other components connected thereto or the sub-networks may restrict access between the components. The network 826 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method implemented by at least one server computer, comprising:
   receiving a plurality of training documents, each training document being defined by a sequence of words, each training document having one or more labels associated therewith;
   embedding the plurality of training documents, the words, and the labels in a vector space, wherein the embedding is configured to locate a given training document and its associated labels in proximity to each other in the vector space;
   embedding a new document in the vector space;
   performing a proximity search in the vector space to identify a set of nearest labels to the new document in the vector space; and
   associating the set of nearest labels to the new document, wherein embedding the new document is configured to predict a target word in the new document using context words in the new document and identification of the new document, and wherein the embedding is configured to minimize a loss function that includes a component configured to approximate a conditional probability of the target word based on the context words and the identification of the new document.

2. The method of claim 1, wherein the method solves a multi-label learning problem, such that a number of the set of nearest labels to the new document is not predefined prior to performing the proximity search.

3. The method of claim 1, wherein the embedding is configured to simultaneously learn document vectors corresponding to the plurality of training documents and label vectors corresponding to the labels directly from the words of the plurality of training documents.

4. The method of claim 3, wherein the embedding is configured to use the document vectors to learn the label vectors by solving a multiclass classification problem.

5. The method of claim 4,
wherein the embedding is configured to predict the labels of the given training document using the identification of the given training document.

6. The method of claim 1,
wherein the loss function includes a component configured to approximate a conditional probability of the labels of the given training document based on the identification of the given training document.

7. The method of claim 1, wherein performing the proximity search includes performing a k-nearest neighbor search.

8. The method of claim 1, wherein the new document is not one of the plurality of training documents and does not have labels already associated therewith, and wherein the embedding of the new document is independent of the embedding of the labels in the vector space.

9. The method of claim 1, further comprising:
receiving a request to access documents associated with one label of the set of nearest labels to the new document; and
in response to the request, providing access to the new document in association with the one label of the set of nearest labels.

10. The method of claim 9, wherein the documents define one or more of articles, product descriptions, and social media posts.

11. The method of claim 9, wherein the request is defined from a search query, a social media access request, a product search, a category request, a topic request, or a community access request.

12. A computer readable medium, being non-transitory, having program instructions embodied thereon, the program instructions being configured, when executed by a computing device, to cause the computing device to perform the following operations:
receive a plurality of training documents, each training document being defined by a sequence of words, each training document having one or more labels associated therewith;
embed the plurality of training documents, the words, and the labels in a vector space, wherein the embedding of the plurality of training documents, the words, and the labels is configured to locate a given training document and its associated labels in proximity to each other in the vector space;
embed a new document in the vector space;
perform a proximity search in the vector space to identify a set of nearest labels to the new document in the vector space; and
associate the set of nearest labels to the new document, wherein the new document that is embedded is configured to predict a target word in the new document using context words in the new document and identification of the new document, and the embedding is configured to minimize a loss function that includes a component configured to approximate a conditional probability of the target word based on the context words and the identification of the new document.

13. The computer readable medium of claim 12, wherein the operations solve a multi-label learning problem, such that a number of the set of nearest labels to the new document is not predefined prior to performing the proximity search.

14. The computer readable medium of claim 12, wherein the embedding is configured to simultaneously learn document vectors corresponding to the plurality of training documents and label vectors corresponding to the labels directly from the words of the plurality of training documents; and
wherein the embedding is configured to use the document vectors to learn the label vectors by solving a multiclass classification problem.

15. A server computer, comprising:
training logic, the training logic configured to,
receive a plurality of training documents, each training document being defined by a sequence of words, each training document having one or more labels associated therewith, and
embed the plurality of training documents, the words, and the labels in a vector space, wherein the embedding is configured to locate a given training document and its associated labels in proximity to each other in the vector space; and
inference logic, the inference logic configured to,
embed a new document in the vector space,
perform a proximity search in the vector space to identify a set of nearest labels to the new document in the vector space, and
associate the set of nearest labels to the new document, wherein the new document that is embedded is configured to predict a target word in the new document using context words in the new document and identification of the new document, and the embedding is configured to minimize a loss function that includes a component configured to approximate a conditional probability of the target word based on the context words and the identification of the new document.

16. The server computer of claim 15, wherein operations solve a multi-label learning problem, such that a number of the set of nearest labels to the new document is not predefined prior to performing the proximity search.

17. The server computer of claim 15, wherein the embedding is configured to simultaneously learn document vectors corresponding to the plurality of training documents and label vectors corresponding to the labels directly from the words of the plurality of training documents; and
wherein the embedding is configured to use the document vectors to learn the label vectors by solving a multiclass classification problem.

* * * * *